United States Patent
Tsochantaridis et al.

(10) Patent No.: US 7,130,837 B2
(45) Date of Patent: Oct. 31, 2006

(54) SYSTEMS AND METHODS FOR DETERMINING THE TOPIC STRUCTURE OF A PORTION OF TEXT

(75) Inventors: Ioannis Tsochantaridis, Providence, RI (US); Thorsten H. Brants, Palo Alto, CA (US); Francine R. Chen, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 499 days.

(21) Appl. No.: 10/103,053

(22) Filed: Mar. 22, 2002

(65) Prior Publication Data
US 2003/0182631 A1    Sep. 25, 2003

(51) Int. Cl.
G06F 17/00    (2006.01)
G06N 7/00     (2006.01)
G06N 7/08     (2006.01)

(52) U.S. Cl. ............................. 706/55; 706/46; 706/45
(58) Field of Classification Search ................... 706/55, 706/46, 45
See application file for complete search history.

(56) References Cited

U.S. PATENT DOCUMENTS

| | | | |
|---|---|---|---|
| 5,606,643 | A | 2/1997 | Balasubramanian et al. |
| 5,659,766 | A | 8/1997 | Saund et al. |
| 5,675,819 | A | 10/1997 | Schuetze |
| 5,687,364 | A | 11/1997 | Saund et al. |
| 5,943,669 | A | 8/1999 | Numata |
| 6,128,634 | A | 10/2000 | Golovchinsky et al. |
| 6,239,801 | B1 | 5/2001 | Chiu et al. |

OTHER PUBLICATIONS

Thomas Hofmann, Probabilistic Latent Semantic Indexing, Aug. 1999, ACM, 1-58113-096-1/99/0007, 50-57.*
Mike Dowman, Content Augmentation for Mixed-Mode News Broadcasts, University of Sheffield.*
Freddy Y. Y. Choi, Latent Semantic Analysis for Text Segmentation, Jun. 2001, University of Manchester.*
A. P. Dempster, Maximum Likelihood from Incomplete Data via the EM Algorithm, 1976, Harvard University, 1-38.*
Thorsteb Brants, Segmentation and Identification fo Document Topics for Creating Document Structure, 2002, PARC, 1-8.*
Brants et al., "Segmentation and Identification of Document Topics for Creating Document Structure", PARC, pp. 1-8, 2002.
Lee, "Measures of Distributional Similarity", Proceedings of the $37^{th}$ ACL, pp. 1-8, 1999.
Blei et al., "Latent Dirichlet Allocation", University of California, pp. 1-8.
Dempster et al., "Maximum Likelihood from Incomplete Data via the EM Algorithm", Royal Statistical Society, pp. 1-38, 1976.

(Continued)

Primary Examiner—Joseph P. Hirl
(74) Attorney, Agent, or Firm—Oliff & Berridge, PLC

(57) ABSTRACT

Systems and methods for determining the topic structure of a document including text utilize a Probabilistic Latent Semantic Analysis (PLSA) model and select segmentation points based on similarity values between pairs of adjacent text blocks. PLSA forms a framework for both text segmentation and topic identification. The use of PLSA provides an improved representation for the sparse information in a text block, such as a sentence or a sequence of sentences. Topic characterization of each text segment is derived from PLSA parameters that relate words to "topics", latent variables in the PLSA model, and "topics" to text segments. A system executing the method exhibits significant performance improvement. Once determined, the topic structure of a document may be employed for document retrieval and/or document summarization.

25 Claims, 9 Drawing Sheets

OTHER PUBLICATIONS

Choi, "Advances in domain independent linear text segmentation", University of Manchester, pp. 1-8.

Hofmann, "Probabilistic Latent Semantic Indexing", EECS Department, pp. 50-57, 1999.

Hearst, "TextTiling: Segmenting Text into Multi-paragraph Subtopic Passages", Computational Linguistics, vol. 23, No. 1, pp. 33-64, 1997.

Li et al., "Topic Analysis Using a Finite Mixture Model", C&C Media Res. Labs., pp. 1-21, 2000.

Li et al., "Topic Analysis Using a Finite Mixture Model", NEC Corporation, pp. 1-10.

Beeferman et al., "Statistical Models for Text Segmentation, School of Computer Science", Carnegie Mellon University, pp. 1-37.

Li et al., "Topic Analysis Using a Finite Mixture Model," NEC Corporation, Oct. 2000, pp. 35-44.

Franz et al., "Segmentation and Detection at IBM: Hybrid Statistical Models and Two-tiered Clustering," IBM T.J. Watson Research Center, Feb. 2000, pp. 1-5.

Dharanipragada et al., "Story Segmentation and Topic Detection in the Broadcast News Domain," IBM T.J. Watson Research Center, Feb. 1999, pp. 65-68.

* cited by examiner given from preprocessing:
   PLSA word distributions $P(w|z)$
   term vectors $f(w|b)$ for each block b in the document to be segmented for each block b:
   calculate $P(z|b)$ from $f(w|b)$ and $P(w|z)$ by PLSA fold-in
   calculate $P(w|b)$ from $P(w|b)$ and $P(w|z)$ for each pair of adjacent blocks $b_l$ and $b_r$:
   calculate $sim(b_l,b_r)$ based on $P(w|b_l)$ and $P(w|b_r)$ for each local minimum in $sim(b_l,b_r)$:
   go to the left (beginning) to find a local similarity maximum $max_l(b_l,b_r)$
   go to the right (end) to find a local similarity maximum $max_r(b_l,b_r)$
   determine the relative dip size $d_{rel}(b_l,b_r) = \dfrac{max_l(b_l,b_r)+max_r(b_l,b_r)}{2 sim(b_l,b_r)} - 1$ emit the positions of pairs $(b_l,b_r)$ with the largest relative dip sizes $d_{rel}(b_l,b_r)$:
   these are the segment boundaries.

FIG. 3

SYSTEMS AND METHODS FOR DETERMINING THE TOPIC STRUCTURE OF A PORTION OF TEXT

BACKGROUND OF THE INVENTION

1. Field of Invention

This invention relates to segmentation and topic identification of a portion of text, or one or more documents that include text.

2. Description of Related Art

In long text documents, such as news articles and magazine articles, a document often discusses multiple topics, and there are few, if any, headers. The ability to segment and identify the topics in a document has various applications, such as in performing high-precision retrieval. Different approaches have been taken. For example, methods for determining the topical content of a document based upon lexical content are described in U.S. Pat. Nos. 5,659,766 and 5,687,364 to Saund et al. Also, for example, methods for accessing relevant documents using global word co-occurrence patterns are described in U.S. Pat. No. 5,675,819 to Schuetze.

One approach to automated document indexing is Probabilistic Latent Semantic Analysis (PLSA), also called Probabilistic Latent Semantic Indexing (PLSI). This approach is described by Hofmann in "Probabilistic Latent Semantic Indexing", Proceedings of SIGIR '99, pp. 50–57, August 1999, Berkley, Calif., which is incorporated herein by reference in its entirety.

Another technique for subdividing texts into multi-paragraph units representing subtopics is TextTiling. This technique is described in "TextTiling: Segmenting Text into Multi-paragraph Subtopic Passages", Computational Linguistics, Vol. 23, No. 1, pp. 33–64, 1997, which is incorporated herein by reference in its entirety.

A known method for determining a text's topic structure uses a statistical learning approach. In particular, topics are represented using word clusters and a finite mixture model, called a Stochastic Topic Model (STM), is used to represent a word distribution within a text. In this known method, a text is segmented by detecting significant differences between Stochastic Topic Models and topics are identified using estimations of Stochastic Topic Models. This approach is described in "Topic Analysis Using a Finite Mixture Model", Li et al., Proceedings of Joint SIGDAT Conference on Empirical Methods in Natural Language Processing and Very Large Corpora, pp. 35–44, 2000 and "Topic Analysis Using a Finite Mixture Model", Li et al., IPSJ SIGNotes Natural Language (NL), 139(009), 2000, each of which is incorporated herein by reference in its entirety.

A related work on segmentation is described in "Latent Semantic Analysis for Text Segmentation", Choi et al, Proceedings of the 2001 Conference on Empirical Methods in Natural Language Processing, pp 109–117, 2001, which is incorporated herein by reference in its entirety. In their work, Latent Semantic Analysis is used in the computation of inter-sentence similarity and segmentation points are identified using divisive clustering.

Another related work on segmentation is described in "Statistical Models for Text Segmentation", Beeferman et al., Machine Learning, 34, pp. 177–210, 1999, which is incorporated herein by reference in its entirety. In their work, a rich variety of cue phrases are utilized for segmentation of a stream of data from an audio source, which may be transcribed, into topically coherent stories. Their work is a part of the TDT program, a part of the DARPA TIDES program.

SUMMARY OF THE INVENTION

The systems and methods according to this invention provide improved text segmentation of a document with improved performance.

The systems and methods according to this invention separately provide topic identification of a document with improved performance.

The systems and methods according to this invention separately determine the topic structure of one or more documents.

The systems and methods according to this invention separately provide improved document retrieval.

In various exemplary embodiments of the systems and methods according to this invention, the topic structure of a document including text is determined by: identifying candidate segmentation points of the text of the document corresponding to locations between text blocks; applying a folding-in process to each text block to determine a distribution of probabilities over a plurality of latent variables for each text block; using the determined distributions to estimate a distribution of words for each text block; making comparisons of the distributions of words in adjacent text blocks using a similarity metric; and selecting segmentation points from the candidate segmentation points of the text based on the comparison to define a plurality of segments. In various exemplary embodiments, making comparisons of the distributions of words in adjacent text blocks using a similarity metric is based on at least one of a variational distance, a cosine distance, a Hellinger or Bhattacharyya distance, a Jensen-Shannon divergence, a weighted sum and a geometric mean.

In various exemplary embodiments of the systems and methods according to this invention, a folding-in process is applied to each segment to determine a distribution of probabilities of latent variables for each segment. Each determined distribution is used to estimate a distribution of words for each segment and at least one topic is identified for each segment based on the distribution of words for each segment.

In various exemplary embodiments, identifying at least one topic for each segment is also based on a measure of an occurrence of a word in each segment. In such exemplary embodiments, identifying at least one topic for each segment may be based on the distribution of words for each segment and an inverse segment frequency of the words in the segments.

In various exemplary embodiments, identifying at least one topic for each segment is also based on term vectors for each segment. In various other exemplary embodiments, identifying at least one topic for each segment is also based on parts of speech of the words in the segments. In various other exemplary embodiments, identifying at least one topic for each segment is also based on mutual information between words in each segment and each segment.

In various exemplary embodiments of the systems and methods according to this invention, a document including text is retrieved by determining topic structures of a plurality of documents and retrieving at least one of the plurality of documents using the topic structures of the documents. In such exemplary embodiments, retrieving at least one of the plurality of documents using the topic structures of the documents is based on at least one key word.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which:

FIG. 3 is an outline of an exemplary embodiment of a segmentation method according to this invention;

DETAILED DESCRIPTION OF EXEMPLARY EMBODIMENTS

Figure 1:
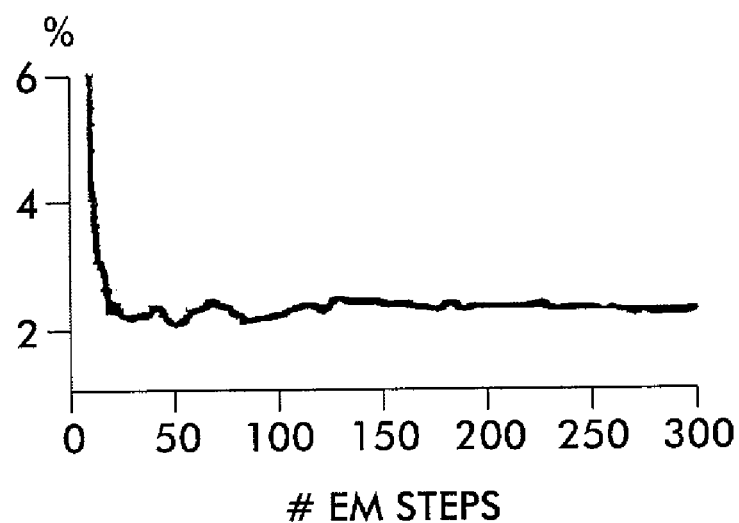
FIG. 1 is a graphical representation of word error rate for segmentation based on the number of EM iterations.

In various exemplary embodiments, the systems and methods according to this invention determine the topic structure of a document by segmenting and identifying the topics in the document. The systems and methods according to this invention employ Probabilistic Latent Semantic Analysis (PLSA). The distance between adjacent blocks of text in the document are compared and segmentation points are selected based on similarity values between pairs of adjacent blocks. In various exemplary embodiments, a vector generated by folding a term vector into a Probabilistic Latent Semantic Analysis model is used to exploit information about semantically similar words.

The systems and methods according to this invention not only segment a document by topic and/or subtopic, but also identify the various topics/subtopics in the text. The identification of topics/subtopics according to this invention is extensible to a variety of genres, such as news articles, books and scientific papers or any other text. Further, the identification of topics/subtopics according to this invention may be independent of cue phrases.

In various exemplary embodiments, the systems and methods according to this invention retrieve a document including text by determining topic structures of a plurality of documents as described herein. Using the topic structures of the documents, at least one of the plurality of documents may be retrieved, for example, based on a key word that is input for searching.

The following description of an exemplary embodiment and various alternatives is by way of example only, and is not intended to be exhaustive or limiting. On the contrary, the exemplary embodiment and various alternatives are intended to provide those skilled in the art with a full understanding of this invention.

In an exemplary embodiment, a plurality of documents including text for which the topic structure is to be determined are identified or selected. Each document is first preprocessed by: (1) tokenizing the document; (2) downcasing each token; (3) stemming each token; and (4) identifying sentence boundaries. Steps 1–3 identify terms in the vocabulary of the text. A subset of the terms of the vocabulary is selected based on the frequency of the terms in the text. For example, only those words with a frequency above a given threshold are used.

The selection of an appropriate subset of the terms enhances performance. The full set of the terms of the vocabulary is noisy and may decrease performance. If too few of the terms of the vocabulary are selected, the subset is sparse, which may lead to an inability to determine a reasonably good estimate of the similarity between blocks of text, as described below. A sparse subset can, in part, be offset by using a larger text block size, but the precision of determining a topic boundary is decreased thereby.

The smallest unit for the segmentation process is an elementary block of text. An elementary block of text is a unit before and after which a segment boundary can occur, but within which no segment boundary can occur. For example, sentences may be used as elementary blocks of text, but other (variable or fixed sized) units are also possible, such as, for example, paragraphs.

The text of the document being pre-processed is broken into sequences of consecutive elementary blocks referred to as text blocks. Each text block comprises a certain number of elementary blocks. In training documents, text blocks are variable-sized, non-overlapping and generally do not cross segment boundaries. However, in the documents to be segmented, text blocks may be overlapping, as in the use of a sliding window. For the actual segmentation process, we define a text block size h, so that text blocks are composed of h elementary blocks. The set of locations between every pair of adjacent text blocks comprise candidate segmentation points.

Each text block b is represented by a term vector $f(w|b)$ representing the frequency of terms or words w in the text block. The text blocks in the entire training collection of documents are used in estimating the parameters of a Probabilistic Latent Semantic Analysis model, described below, using an Expectation-Maximization or EM algorithm, where the number of latent variables or "clusters" Z is preset. The EM algorithm is described in "Maximum Likelihood from Incomplete Data via the EM Algorithm", Dempster et al., Journal of the Royal Statistical Society, 39(1), pp. 1–21, 1997, which is incorporated herein by reference in its entirety.

Based on experimental results, a useful number of clusters is approximately twice the number of human-assigned topics, depending on the nature of the documents.

Probabilistic Latent Semantic Analysis (PLSA) utilizes a statistical latent class model or aspect model, as described in the article "Probabilistic Latent Semantic Indexing" by Hofmann, incorporated by reference above. The model is fitted to a training corpus by the EM algorithm. The EM algorithm assigns probability distributions over classes to words and documents. This allows the words and documents to belong to more than one class, and not to only one class as is true of most other classification methods. Probabilistic Latent Semantic Analysis represents the joint probability of a document d and a word w based on a latent class variable z:

$$P(d, w) = P(d)\sum_{z} P(w|z)P(z|d) \qquad (1)$$

A model is fitted to a training corpus D by maximizing the log-likelihood function L using the EM algorithm:

$$\mathcal{L} = \sum_{d \in \mathcal{D}} \sum_{w \in d} f(d,w)\log P(d,w). \qquad (2)$$

Figure 2:
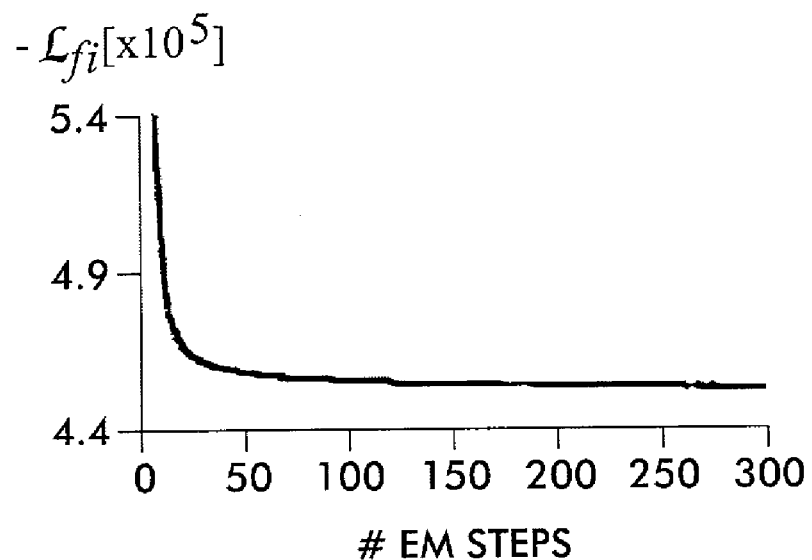
FIG. 2 is a graphical representation of folding-in likelihood based on the number of EM iterations.

Iterations of the EM algorithm maybe run until the log likelihood does not decrease significantly. However, a small number of iterations, for example, twenty, may be sufficient. The segmentation process is not very sensitive to the exact number of EM iterations performed in the Probabilistic Latent Semantic Analysis training process. FIG. 1 illustrates the word error rate for segmentation of the Reuters-21578 corpus using 128 classes. As shown in FIG. 1, error rate significantly decreases during the first few iterations or steps, and then flattens out. If labeled held-out data is available, one can draw the corresponding graph for the held-out data and decide on the number of iterations. If no labeled held-out data is available, one can use the folding-in likelihood instead. FIG. 2 illustrates the folding-in likelihood values word error rate for segmentation of the Reuters-21578 corpus using 128 classes. As shown in FIG. 2, the folding-in likelihood flattens out after approximately the same number of iterations or steps as the graph for word error rate and can be used to indicate when to stop training iterations. The folding in likelihood for a data set consisting of one or more text documents q may be calculated by:

$$\mathcal{L}_{fi}(Q) = \sum_{q \in Q} \sum_{w \in q} f(w_i\ q)\log \sum_{z} P(w|z)P_{fi}(z|q)$$

where P(w|z) are the parameters obtained from the PLSA model and $P_{fi}(z|q)$ are determined by folding-in.

Estimation of the parameters yields distributions P(z|b) for the training blocks b and latent variables z, and P(w|z) for the selected words w. The distributions P(w|z) are used in the segmentation process described below.

One uses the parameters P(w|z) obtained in the training process to later calculate P(z|q) for the actual documents q with the folding-in process. In the folding-in process, Expectation-Maximization is used in a similar manner to the training process: the Expectation step is identical, the Maximization step keeps all the P(w|z) constant, and only P(z|q) is re-calculated. Typically, a very small number of iterations is sufficient for folding-in.

Candidate segmentation points are identified during the pre-processing of the documents. The candidate segmentation points correspond to the locations between the text blocks. Folding-in, as described in article "Probabilistic Latent Semantic Indexing" by Hofmann, incorporated by reference above, is then performed on each text block b to determine the probability distribution among the set of clusters, P(z|b), where z is a latent variable. The estimated distribution of words for each block b, P(w|b), is then determined:

$$P(w|b) = \sum_{z} P(w|z)P(z|b) \qquad (3)$$

for all words w, where P(w|z) is taken from the Probabilistic Latent Semantic Analysis clustering of the training documents. The distribution of words w in adjacent text blocks is compared using a similarity metric. A "dip" is a local minimum in the similarity of adjacent text blocks. The depth of a dip relative to an adjacent peak is the difference between the similarity value at the peak and the similarity value at the dip, $sim(b_l, b_r)$. The size of a dip is the average of the depth of the dip relative to the peak to the left, $max_l$, and the peak to the right, $max_r$. The relative size of a dip is the size of a dip divided by the similarity value at the dip:

$$d_{rel}(b_l, b_r) = \frac{max_l(b_l, b_r) - sim(b_l, b_r)}{2sim(b_l, b_r)} + \frac{max_r(b_l, b_r) - sim(b_l, b_r)}{2sim(b_l, b_r)}$$

$$= \frac{max_l(b_l, b_r) + max_r(b_l, b_r)}{2sim(b_l, b_r)} - 1$$

Other approaches can also be used. For example, the maximum of the depth of the dip relative to the left peak and the depth of the dip relative to the right peak may be used. Then, the relative size of a dip is computed as:

$$d_{rel}(b_l, b_r) = \frac{max[max_l(b_l, b_r), max_r(b_l, b_r)] - sim(b_l, b_r)}{sim(b_l, b_r)}$$

If the number of segments is known in advance, the dips with the largest relative dip size are selected as the segmentation points. If the number of segments is not known, a method for automatic termination is needed. In other words, a determination must be made as to which dips actually constitute a segment boundary and which do not. The determination may be made based on a threshold $\theta_{term}$. If the relative dip size $d_{rel}$ is smaller than this threshold, the dip is ignored. The threshold may be determined in preliminary testing. The threshold may be $\theta_{term}$=1.2, for example.

An outline of an exemplary embodiment of a segmentation method according to this invention is shown in FIG. 3.

Figure 4:
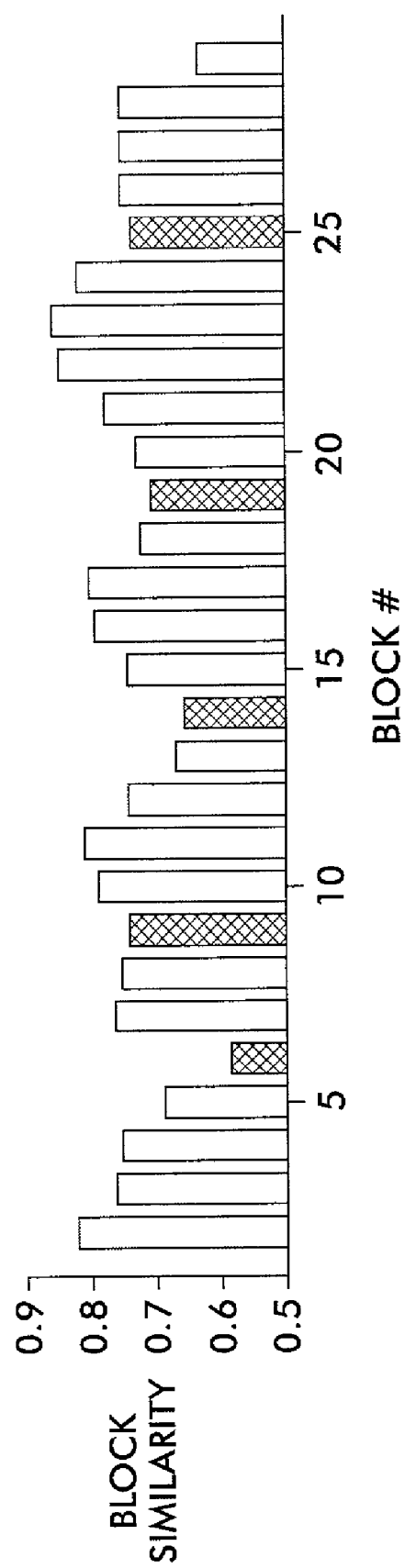
FIG. 4 is a graphical representation of segment similarity based on the exemplary embodiment illustrated in FIG. 3.

FIG. 4 is an exemplary segment similarity graph based on the exemplary segmentation method applied to article #14891 of the Reuters-21578 corpus. As shown in FIG. 4, five dips occur in the document at text blocks 6, 9, 14, 19 and 25. The lowest absolute similarity value is at text block 6. The relative dip sizes at text blocks 6, 14, and 19 are above a selected threshold of 1.2. Thus, text blocks 6, 14 and 19 are selected as segmentation points or boundaries. The relative dip sizes at text blocks 9 and 25 are below the threshold, and are therefore ignored.

Smaller dips in similarity values may be indicative of a smaller topic transition or may be due to "noise" in the similarity values when transitioning from one topic to another over several sentences. In most cases, it is desirable to estimate the dip size ignoring the smaller dips. To do this, the similarity values may be smoothed with an n-point median smoother, such as the 3-point median smoother described by Tukey, "Exploratory Data Analysis", Addison Wesley Longman, Inc., Reading Mass., 1997, which is incorporated herein by reference in its entirety. Other approaches, such as, for example, a weighted sum or geometric mean, can also be used for smoothing the similarity values. Any other suitable smoothing technique, either known or hereafter developed, may be used. The smoothed similarity values may then be used to identify the range of text blocks covered by the dip.

Figure 5:
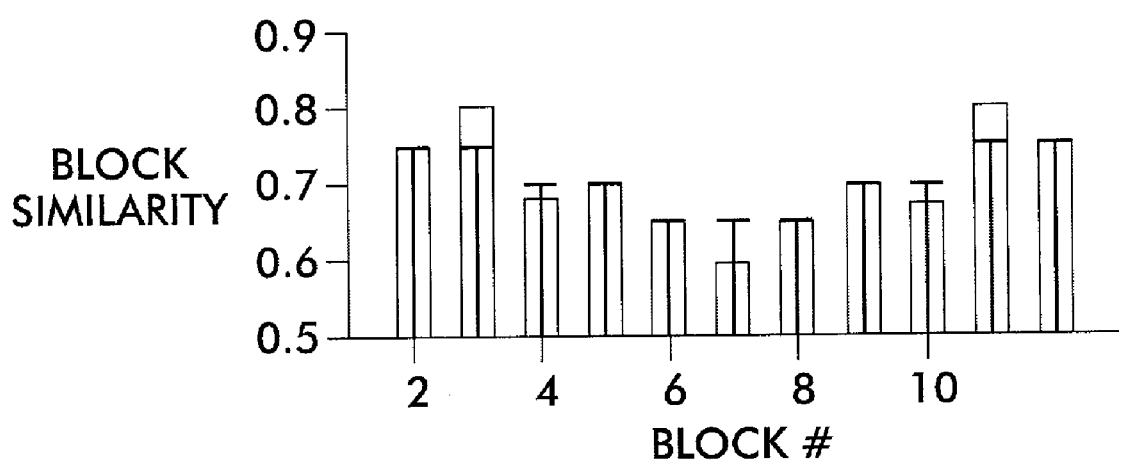
FIG. 5 is a graphical representation of smoothed and unsmoothed similarity values.

The actual dip size should be determined using the smoothed similarity values, since the unsmoothed values tend to reduce the dip size. FIG. 5 illustrates this situation with the unsmoothed values represented by blocks and the smoothed values represented by T-lines. When determining the relative dip size for the dip at block 7 without smoothing, the surrounding maxima are at blocks 5 and 9, yielding a relatively small dip. If smoothing is applied to find the maxima and the original values are used to determine the dip size, blocks 3 and 11 are identified as the surrounding maxima, yielding a much deeper dip.

Different similarity metrics between two text blocks $b_l$ and $b_r$ may be used in the systems and methods according to this invention.

One is based on the variational or $L_1$ distance:

$$sim_{LI} = 1 - \frac{\sum_w |P(w|b_l) - P(w|b_r)|}{2} \tag{4}$$

Another metric is the cosine distance:

$$sim_{cos} = \frac{\sum_w P(w|b_l)P(w|b_r)}{\sqrt{\sum_w P(w|b_l)^2} \sqrt{\sum_w P(w|b_r)^2}} \tag{5}$$

A third metric is the Hellinger or Bhattacharyya distance:

$$sim_{Hel} = \sum_w \sqrt{(Pw|b_l)P(w|b_r)} \tag{6}$$

A fourth metric is related to the Jensen-Shannon divergence:

$$sim_{JS} = 1 - \frac{KL\left(P_l \left\| \frac{P_l + P_r}{2}\right.\right) + KL\left(P_r \left\| \frac{P_l + P_r}{2}\right.\right)}{2} \tag{7}$$

where $KL(\cdot\|\cdot)$ is the Kullback-Leibler divergence (or relative entropy).

For each segment s that is identified during the segmentation process described above, P(z|s) is determined by folding-in. The probability distribution P(z|s) is used to determine the word distribution P(w|s), analogously to the determination of the word distribution for a text block described above:

$$P(w|s) = \sum_z P(w|z)P(z|s) \tag{8}$$

where P(w|z) is taken from the Probabilistic Latent Semantic Analysis clustering of the training documents. Those words with high P(w|s) characterize the topic of a segment: The selection of topic words may be:

- based on P(w|s) alone, selecting a certain number of words with highest probabilities;
- based on a mixture of P(w|s) and the term vectors for that segment f(w|s), giving higher weight to words that actually occur in the segment—in the extreme case, selecting only words that actually occur in the document;
- based on one of the above in combination with a measure of the occurrence of the term in each segment, for example, the "inverse segment frequency"—similar to the "inverse document frequency" as used in the TFIDF weighting well-known in the text retrieval art—so that terms that occur in only a few segments are given higher weight;
- additionally based on the part of speech or syntactic category of the words; and/or
- based on mutual information between the words and the segments, ranking words based on how well each characterizes a segment and simultaneously differentiates the segment from other segments—an extension of the method outlined by McCallum et al., "A Comparison Event Model for Naïve Bayes Text Classification", Proc. AAAI-98 Workshop on Learning for Text Categorization, 1998, which describes a method based on the mutual information between the words and relevant and non-relevant documents, and which is incorporated herein by reference in its entirety, with each segment considered being analogous to the relevant document set and the other segments being analogous to the non-relevant document set so that the words or phrases with the largest value of mutual information for a given segment are selected as representatives characterizing that segment.

Sequences of words, such as pairs, triples, etc., may be considered in addition to single words. This requires an adjustment of the PLSA model. Instead of determining probabilities P(w|d) for only single words w, probabilities $P(W_1,W_2|d)$ are determined also for pairs of words, analogously for triples, etc. Pairs generally have a smaller occurrence probability than single words. Therefore, normalization for the length of the sequence is needed. This may be accomplished by taking the nth root and ranking by comparing the values $P(sequence|d)^{1/n}$ with n being the length of the sequence.

For example, words w for a segment s that are nouns, both common and proper nouns, that actually occur in the segment and that have highest P(w|s) after folding-in may be extracted. When considering single keywords, nouns are more informative than other categories or parts of speech. Thus, keywords may be restricted to nouns, for example, for a document retrieval system.

Figure 6:
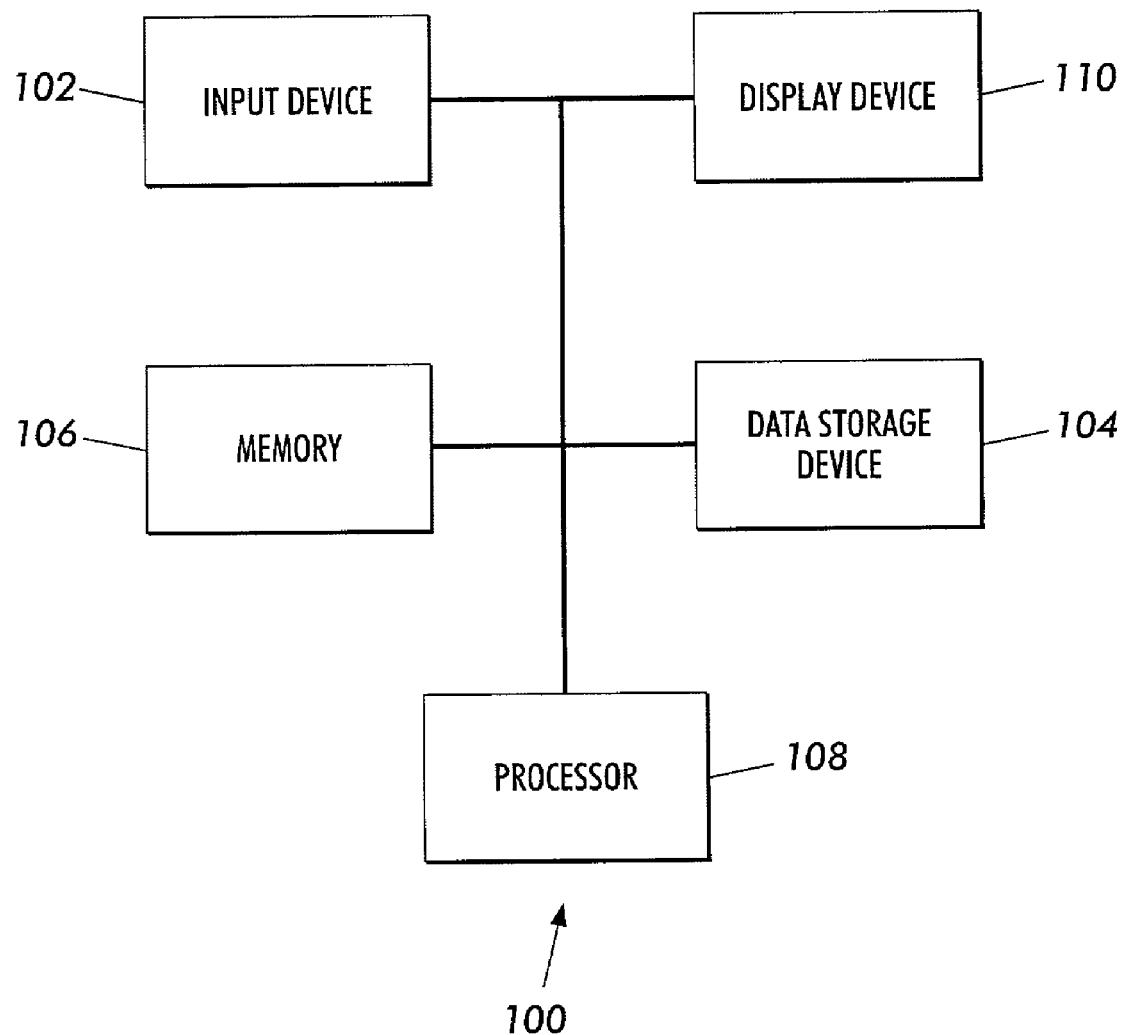
FIG. 6 is a block diagram of an exemplary embodiment of a topic identification system according to this invention.

FIG. 6 is a block diagram of an exemplary embodiment of a topic identification system 100 according to this invention. The system 100 may be used to implement, for example, the various flowcharts described below. According to the exemplary embodiment, the system 100 comprises an input device 102, a data storage device 104, memory 106 and a display device 110, which are communicated with each other via a link 101.

In use, a portion of text may be input into the system 100 via the input device 102 and stored in the data storage device 104. Using memory 106 and accessing the portion of text and one or more PLSA models stored in the data storage device 104, the processor 108 processes the portion of text according to the method of this invention, for example, applying a folding-in process to determine a probability distribution of a latent variable for a plurality of segments of the portion of text, using each determined distribution to estimate a distribution of words for each segment, and identifying at least one topic for each segment based on the distribution of words for each segment. The identified topic may then be stored in the data storage device and/or output, for example, on the display device 110.

The systems and methods for segmentation and topic identification according to this invention may be implemented on a programmed general purpose computer. However, the systems and methods according to this invention can also be implemented on a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the outline shown in FIG. 3 and the flowcharts shown in FIGS. 7–10 can be used to implement the systems and methods according to this invention.

The various blocks shown in FIG. 6 can be implemented as portions of a suitably programmed general-purpose computer. Alternatively, the various blocks can be implemented as physically distinct hardware circuits within an ASIC, or using a FPGA, a PDL, a PLA or a PAL, or using discrete logic elements or discrete circuit elements. The particular form each of the blocks will take is a design choice and will be obvious and predicable to those skilled in the art.

The memory 106 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The link 101 can be any known or later developed device or system for connecting the various components of the system 100. The system 100 may include one or more of a direct cable connection, a connection over a wide area network or a local area network, a connection over an intranet, a connection over the Internet, or a connection over any other distributed processing network or system. In general, the link 101 can be any known or later developed connection or communication system.

Further, it should be appreciated that the link 101 can be a wired or wireless link to a network. The network can be a local area network, a wide area network, an intranet, the Internet, or any other distributed processing and storage network.

Similarly, the input device 102, the data storage device 104 and the display device 110 may be any suitable device, either known or hereafter developed, that is capable of carrying out the required function. For example, the input device 102 may be any of a scanner, a keyboard, a CD-ROM, a floppy disk and the like. The data storage device 104 may be any of a hard drive, a floppy disk drive, a CD-ROM drive and the like. The display device 110 may be a monitor, a projector, a printer, a speaker and the like.

Figure 7:
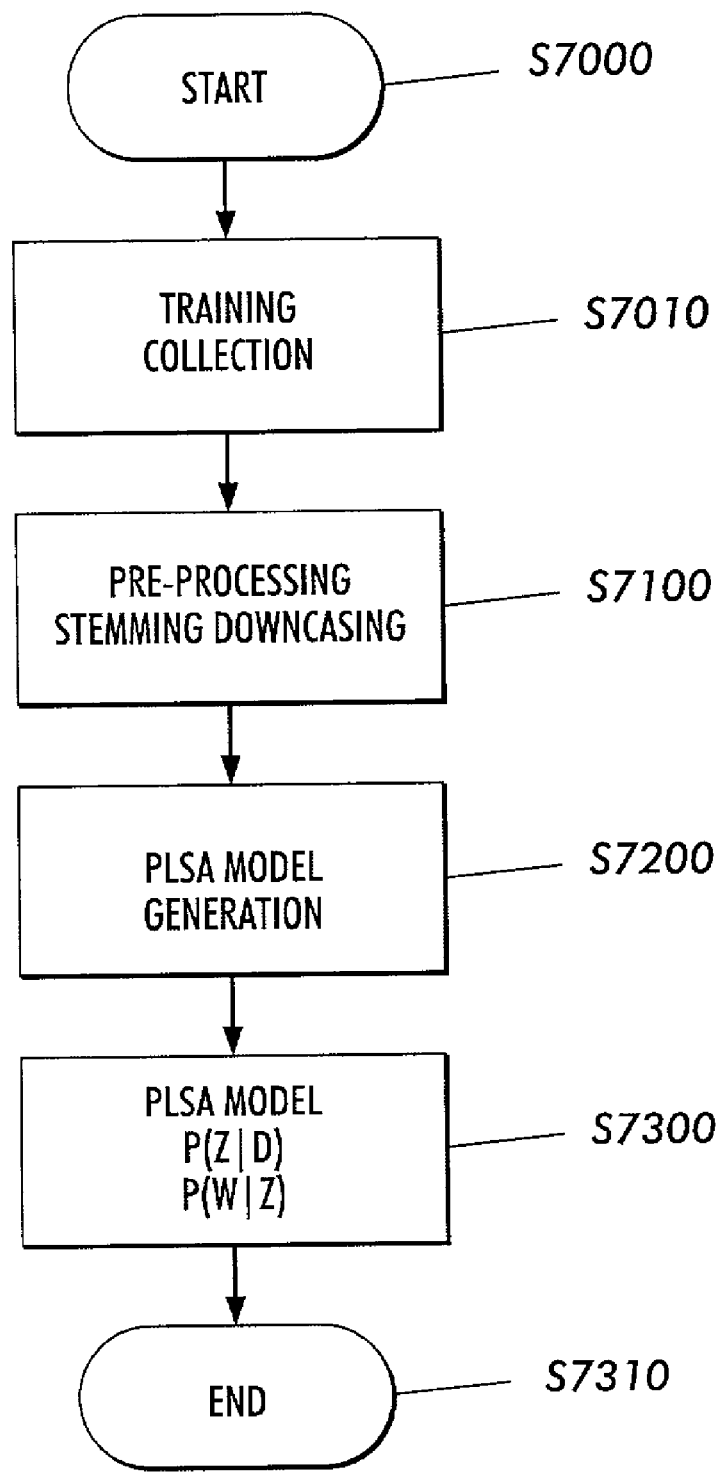
FIG. 7 is an exemplary flowchart illustrating a conventional method of preparing training data.

FIG. 7 is an exemplary flowchart illustrating a conventional method of preparing training data. Control begins in step S7000 and continues to step S7010, where a training collection of text, such as a document d, is provided. Then, in step S7100, the training collection is subjected to preprocessing, such as stemming, downcasing and the like, and broken down into a plurality of text blocks b. Next, in step S7200, the text blocks are then used to estimate the parameters of a PLSA model, as described above. The PLSA model is then used in step S7300 to determine the probabilities of P(z|d) and P(w|z) for each document d and a word w based on a latent class variable z. Control ends in step S7310.

Figure 8:
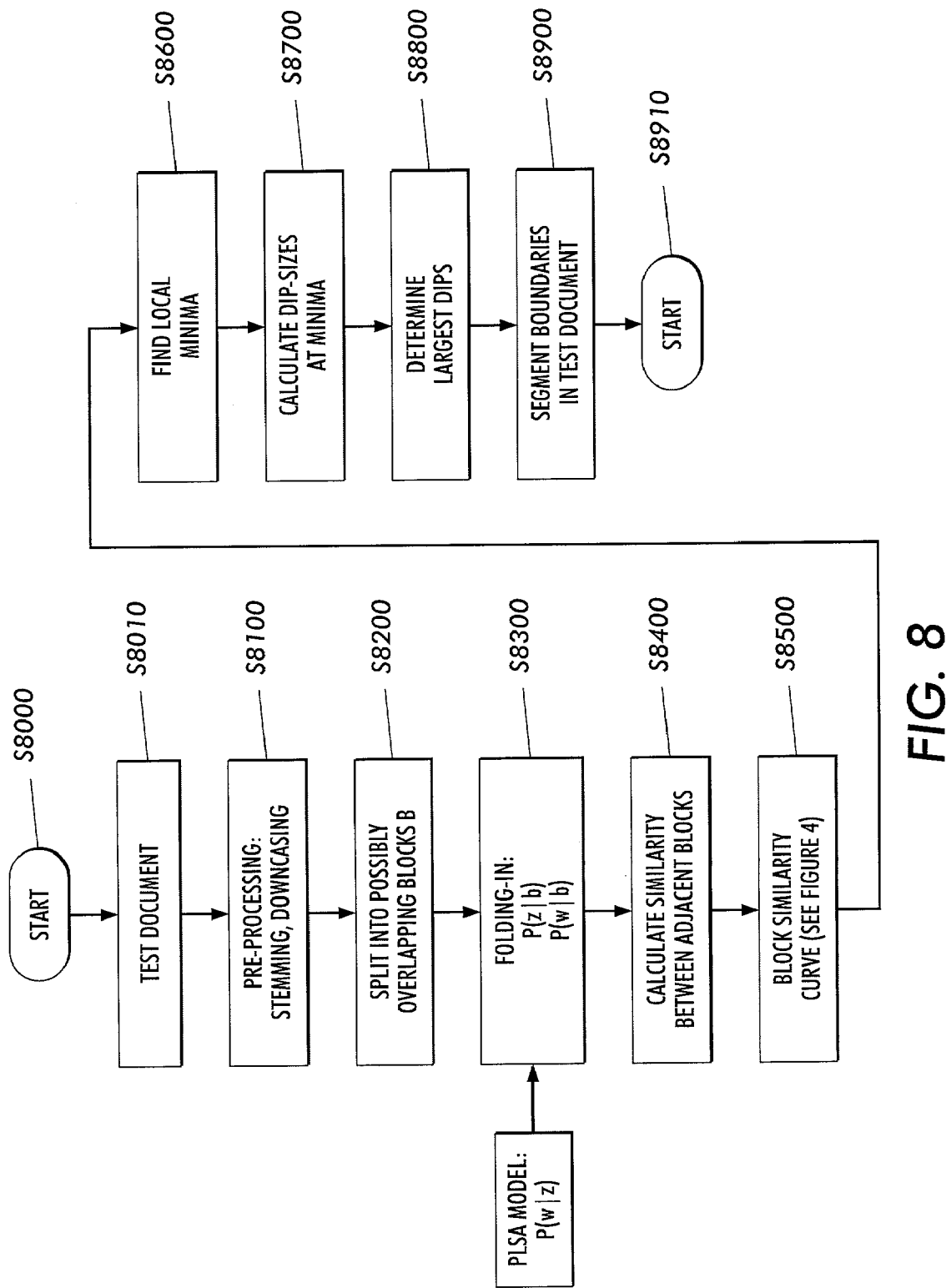
FIG. 8 is a flowchart illustrating an exemplary embodiment of a segmentation method using one PLSA model according to this invention.

FIG. 8 is a flowchart illustrating an exemplary embodiment of a segmentation method using one PLSA model according to this invention. Control begins in step S8000 and continues to step S8010, where a text such as a test document is provided. Then, in step S8100, the test document is subjected to preprocessing and, in step S8200, split into a plurality of text blocks b. Next, in step S8300, the text blocks are subjected to a folding-in process using the PLSA model. The similarity between adjacent text blocks is then calculated in step S8400 and, in step 8500, the calculated similarities are used to generate a block similarity curve, such as that illustrated in FIG. 4, for example.

Once the similarity curve is generated, local minima can be identified in step S8600. The dip-size at each minimum is calculated in step S8700 and, in step S8800, the largest dips, or dips that meet a particular threshold, are determined from the calculated dip-sizes. Then, in step S8900, segment boundaries for the text document are determined based on the largest dips. Control ends in step S8910.

Figure 9:
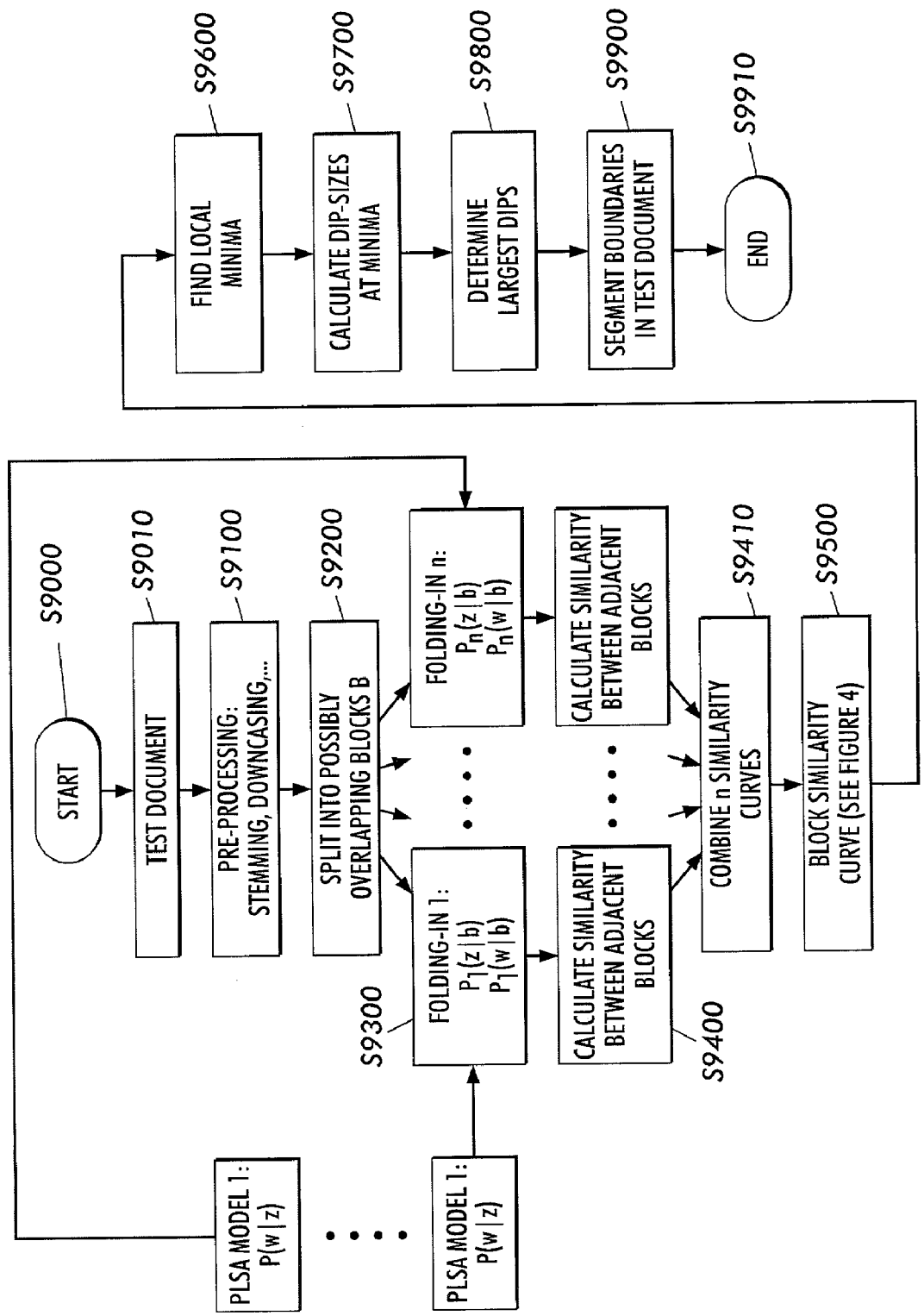
FIG. 9 is a flowchart illustrating an exemplary embodiment of a segmentation method using a plurality of PLSA models according to this invention.

FIG. 9 is a flowchart illustrating an exemplary embodiment of a segmentation method using a plurality of PLSA models according to this invention. The flowchart of FIG. 9 parallels the flowchart of FIG. 8, similar numbers identifying corresponding steps. The difference is that, in step S9300, a plurality of PLSA models, obtained with different random initializations of the models prior to training each model or using different numbers of latent variables, are used in a plurality of folding-in processes to determine a corresponding plurality of probabilities. Then, in step S9400, the similarity between adjacent text blocks is calculated for each set of probabilities. Accordingly, an additional step S9410 is needed to combine the plurality of similarity curves.

Figure 10:
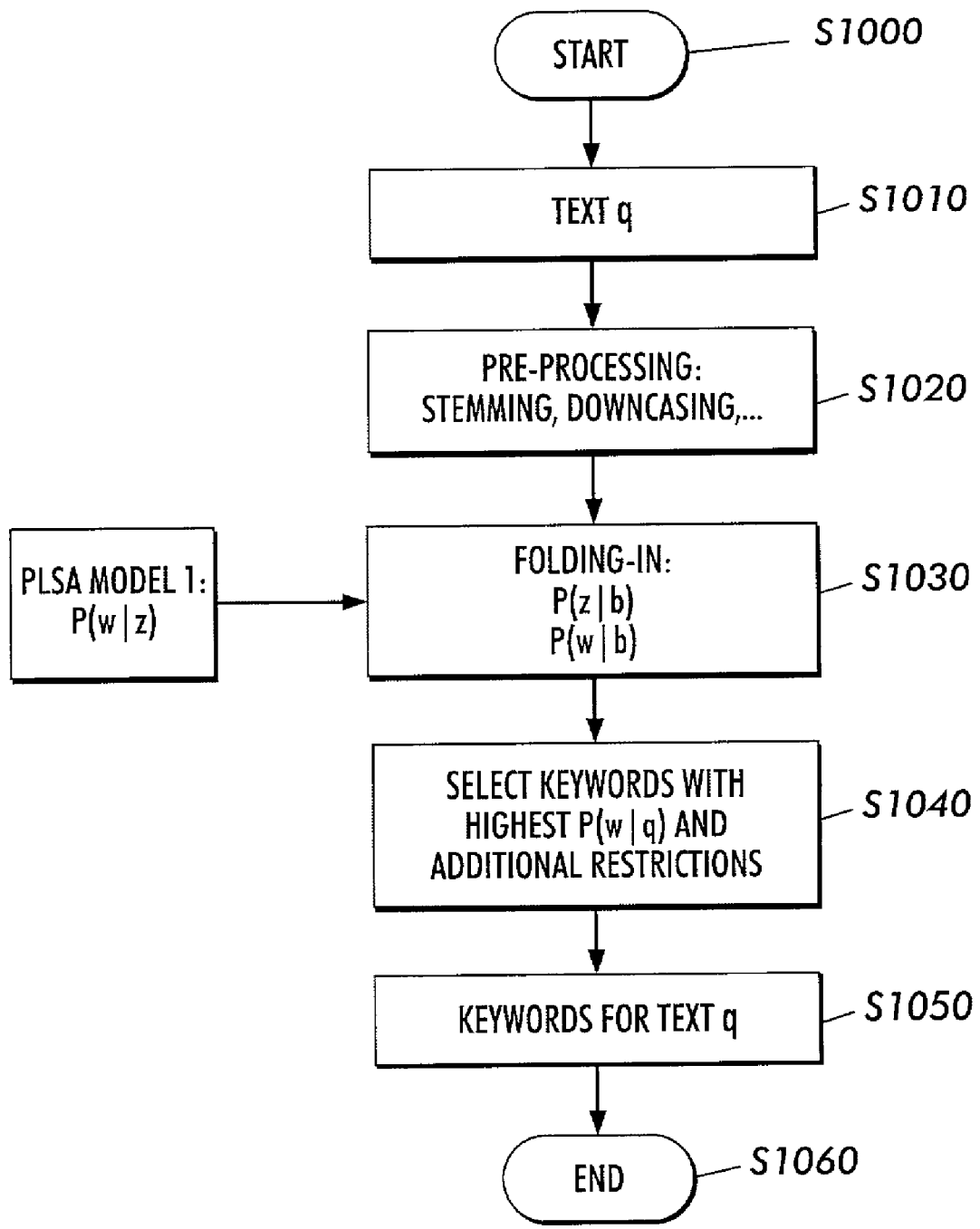
FIG. 10 is a flowchart illustrating an exemplary embodiment of a topic identification method according to this invention.

FIG. 10 is a flowchart illustrating an exemplary embodiment of a topic identification method according to this invention. For example, the method can be used to determine key words of a given text q. Control begins in step S1000 and continues to step S1010, where the text q is provided. Then, in step S1020, the text q is subjected to preprocessing and split into text blocks. Next, in step S1030, the text blocks are subjected to a folding-in process using the PLSA model. In step S1040, words with the highest probability P(w|q), and meeting any other suitable criteria such as occurrence in the text, syntactic category, mutual information and the like, are selected. Then, in step S1050, keywords for the text q are identified. Control ends in step S1060.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

What is claimed is:

1. A computerized method for determining the topic structure of a portion of text, comprising:
   identifying candidate segmentation points of the portion of text corresponding to locations between text blocks;
   determining a distribution of probabilities over a plurality of latent classes for each text block;
   using the determined distributions to estimate a distribution of words for each text block;
   making comparisons of the distribution of words in adjacent text blocks using a similarity metric to determine similarity values
   smoothing the similarity values after making comparisons; and
   selecting segmentation points from the candidate segmentation points of the portion of text based on the comparison to define a plurality of segments.

2. The method of claim 1, wherein smoothing the similarity values is based on a weighted sum.

3. The method of claim 1, wherein smoothing the similarity values is based on a geometric mean.

4. The method of claim 1, wherein smoothing the similarity values is based on a n-point median smoother.

5. A computerized method for determining the topic structure of a portion of text, comprising:
   identifying candidate segmentation points of the position of test corresponding to locations between text blocks;
   determining a distribution of probabilities over a plurality of latent classes for each text block;
   using the determined distributions to estimate a distribution of words for each text block;
   making comparisons of the distributions of words in adjacent text blocks using a similarity metric to determine similarity values; and
   selecting segmentation points from the candidate segmentation points of the portion of text based on the comparison to define a plurality of segments;
   wherein making comparisons of the distributions of words in adjacent text blocks using a similarity metric is based on at least one of a Hellinger distance or a Jensen-Shannon divergence.

6. A computerized method for determining the topic structure of a portion of text having one or more segments, comprising:
   applying a folding-in process to each segment to determine a probability distribution over latent classes for each segment;
   using each determined distribution to estimate a distribution of word groups for each segment; and
   identifying at least one topic for each segment based on the distribution of word groups for the segment;
   wherein identifying at least one topic for each segment is also based on at least one of a measure of an occurrence of word groups in each segment, term vectors for each segment, on parts of speech of the word groups in the segments, and on mutual information between word groups in each segment and each segment.

7. The method of claim 6, wherein, when identifying at least one topic for each segment is also based on the measure of the occurrence of word groups in each segment, identifying at least one topic for each segment is based on the distribution of word groups for each segment and on inverse segment frequency of word groups in the segments.

8. The method of claim 6, wherein, when identifying at least one topic for each segment is also based on the term vectors for each segment, identifying at least one topic for each segment is also based on a measure of an occurrence of word groups in the segments.

9. The method of claim 8, wherein identifying at least one topic for each segment is based on the distribution of word groups for each segment and an inverse segment frequency of word groups in the segments.

10. The method of claim 6, wherein, when identifying at least one topic for each segment is also based on the parts of speech of the word groups in the segments, identifying at least one topic for each segment is also based on a measure of an occurrence of word groups in each segment.

11. The method of claim 10, wherein identifying at least one topic for each segment is based on the distribution of word groups for each segment and an inverse segment frequency of word groups in the segments.

12. The method of claim 6, wherein when identifying at least one topic for each segment is also based on the mutual information between word groups in each segment and each segment, identifying at least one topic for each segment is also based on a measure of an occurrence of word groups in each segment.

13. The method of claim 11, wherein identifying at least one topic for each segment is based on the distribution of word groups for each segment and an inverse segment frequency of word groups in the segments.

14. The method of claim 6, wherein each word group includes one or more words.

15. A computerized method for retrieving a portion of text, comprising:
   determining topic structures of a plurality of portions of text by;
      determining a distribution of probabilities over a plurality of latent classes for each text block;
      using the determined distributions to estimate a distribution of words for each text block;
      making comparisons of the distributions of words in adjacent text blocks using a similarity metric to determine similarity values; and
      selecting segmentation points from the candidate segmentation points of the portion of text based on the comparison to define a plurality of segments; and
   retrieving at least one of the plurality of portions of text using the topic structures of the portions of text.

16. The method of claim 15, wherein retrieving at least one of the plurality of portions of text using the topic structures of the portions of text is based on at least one key word.

17. A system for determining the topic structure of a portion of text, comprising:
   an input device for inputting a portion of a text; and
   at least one processor for applying a folding-in process to each of a plurality of segments of the portion of text to determine a probability distribution over latent classes for each segment, estimating a distribution of word groups for each segment based on the determined probability distribution and identifying at least one topic for each segment based on the distribution of word groups for each segment, wherein the at least one processor identifies the plurality of segments of the portion of text.

18. A computerized method for determining the topic structure of a portion of text, comprising:
- identifying candidate segmentation points of the portion of text corresponding to locations between text blocks;
- determining a plurality of PLSA models;
- applying a folding-in process with each model to each text block to determine a distribution of probabilities over a plurality of latent classes for each text block;
- using the determined distributions to estimate a plurality of word group distributions for each text block;
- averaging the plurality of word group distributions for each text block;
- making comparisons of the plurality of word groups distributions in adjacent text blocks using a similarity metric to determine similarity values based on the averaged plurality of word group distributions; and
- selecting segmentation points from the candidate segmentation points of the portion of text based on the comparison to define a plurality of segments;
- wherein determining a plurality of PLSA models uses at least one of different initializations of the models prior to training each model and different numbers of latent variables.

19. A computerized method for determining the topic structure of a portion of text comprising;
- identifying candidate segmentation points of the portion of text corresponding to locations between text blocks;
- determining a plurality of PLSA models;
- applying a folding-in process with each model to each text block to determine a distribution of probabilities over a plurality of latent classes for each text block;
- using the determined distributions to estimate a plurality of word group distributions for each text block;
- averaging the plurality of word group distributions for each text block;
- smoothing the similarity values after averaging;
- making comparisons of the plurality of word groups distributions in adjacent text blocks using a similarity metric to determine similarity values based on the averaged plurality of word group distributions; and
- selecting segmentation points from the candidate segmentation points of the portion of text based on the comparison to define a plurality of segments.

20. A computerized method for determining the topic structure of a portion of text, comprising:
- identifying candidate segmentation points of the portion of text corresponding to locations between text blocks;
- determining a plurality of PLSA models;
- applying a folding-in process with each model to each text block to determine a distribution of probabilities over a plurality of latent classes for each text block;
- using the determined distributions to estimate a plurality of word group distributions for each text block;
- making comparisons of the plurality of word group distributions in adjacent text blocks using a similarity metric to determine similarity values;
- averaging the similarity values; and
- selecting segmentation points from the candidate segmentation points of the portion of text based on the comparison to define a plurality of segments;
- wherein determining a plurality of PLSA models uses at least one of different initializations of the models prior to training each model and different numbers of latent variables.

21. A computerized method for determining the topic structure of a portion of text comprising:
- identifying candidate segmentation points of the portion of text corresponding to locations between text blocks;
- determining a plurality of PLSA models;
- applying a folding-in process with each model to each text block to determine a distribution of probabilities over a plurality of latent classes for each text block;
- using the determined distributions to estimate a plurality of word group distributions for each text block;
- making comparisons of the plurality of word group distributions in adjacent text blocks using a similarity metric to determine similarity values;
- averaging the similarity values;
- smoothing the similarity values after averaging; and
- selecting segmentation points from the candidate segmentation points of the portion of text based on the comparison to define a plurality of segments.

22. A computerized method for determining the number of training iterations for obtaining a PLSA model, comprising:
- determining a likelihood value according to the formula $$L_{fi}(Q) = \sum_{q \in Q} \sum_{w \in q} f(w, q) \log \sum_{z} P(w|z) P_{fi}(z|q)$$

for each iteration;
- comparing the likelihood value of a current iteration to the likelihood value of a previous iteration; and
- determining the number of training iterations as the current number of iterations when a difference between the likelihood value of the current iteration and the likelihood value of the previous iteration is less than a selected threshold value.

23. A computerized method for determining the topic structure of a portion of text, comprising:
- identifying candidate segmentation points of the portion of text corresponding to locations between text blocks;
- determining a distribution of probabilities over a plurality of latent classes for each text block;
- using the determined distributions to estimate a distribution of words for each text block;
- making comparisons of the distributions of words in adjacent text blocks using a similarity metric to determine similarity values; and
- selecting segmentation points from the candidate segmentation points of the portion of text based on the comparison to define a plurality of segments;
- wherein determining a distribution of probabilities is performed by applying a folding-in process to each text block.

24. A computerized method for determining the topic structure of a portion of text, comprising:
- identifying candidate segmentation points of the portion of text corresponding to locations between text blocks;
- determining a distribution of probabilities over a plurality of latent classes for each text block;
- using the determined distributions to estimate a distribution of words for each text block;
- making comparisons of the distributions of words in adjacent text blocks using a similarity metric to determine similarity values;
- determining local dips in the similarity values after making comparisons; and selecting segmentation points from the candidate segmentation points of the portion of text based on the comparison to define a plurality of segments.

25. A computerized method for determining the topic structure of a portion of text comprising:

identifying candidate segmentation points of the portion of text corresponding to locations between text blocks;

determining a distribution of probabilities over a plurality of latent classes for each text block;

using the determined distributions to estimate a distribution of words for each text block;

making comparisons of the distributions of words in adjacent text blocks using a similarity metric to determine similarity values; and selecting segmentation points from the candidate segmentation points of the portion of text based on the comparison to define a plurality of segments;

wherein making comparisons of the distribution of words in adjacent text blocks using a similarity metric is based on a cosine distance or a variational distance.

* * * * *